United States Patent [19]

Grayson

[11] Patent Number: 4,670,644

[45] Date of Patent: Jun. 2, 1987

[54] CREDIT CARD SECURITY SYSTEM

[76] Inventor: Robert E. Grayson, Rte. 2 S. Box 2186, Great Falls, Mont. 59401

[21] Appl. No.: 698,346

[22] Filed: Feb. 4, 1985

[51] Int. Cl.$^4$ .................................... G06K 19/00
[52] U.S. Cl. .................................... 235/487; 235/494
[58] Field of Search ............... 235/487, 494; 273/146, 273/153 R, 153 S, 283, 299

[56] References Cited

U.S. PATENT DOCUMENTS

| 1,527,473 | 12/1923 | Eisele | 273/146 |
| 3,606,916 | 5/1972 | McDermott | 235/487 |
| 4,026,558 | 5/1977 | Patin | 273/299 |

FOREIGN PATENT DOCUMENTS 560302   3/1944   United Kingdom ............ 273/146

Primary Examiner—Harold I. Pitts
Attorney, Agent, or Firm—Matthew L. Ajeman

[57] ABSTRACT

A credit card security system employs a personal identification code in the form of a combination of numerals or letters combined with a pre-selected color, and issued to a credit card customer by a credit issuing company preferably in the form of a token having a face of the appropriate color and provided with suitable indicia setting forth the numeral or letter combination part of the code, or as a decal likewise setting forth the code. A card in the form of a planar element is provided with a suitable surface containing a grid of generally rectangular boxes each of a different color is provided to a merchant, and the like, honoring a card issued by the particular credit card company so that a person presenting a card for payment of goods or services can inscribe the indicia of the identification code into the properly colored box. Preferably, the card forming the grid of colored boxes is a removable part of a credit sales slip. If decals are provided by the credit card company to indicate the personal identification code, they can be placed on an appropriate block-like member having either appropriately color-coded faces or of a uniform color with color-coded indicia provided on the associated decal.

11 Claims, 5 Drawing Figures

FIG. 1
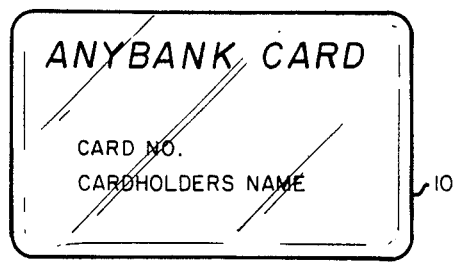
FIG. 2
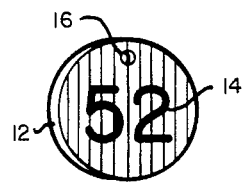
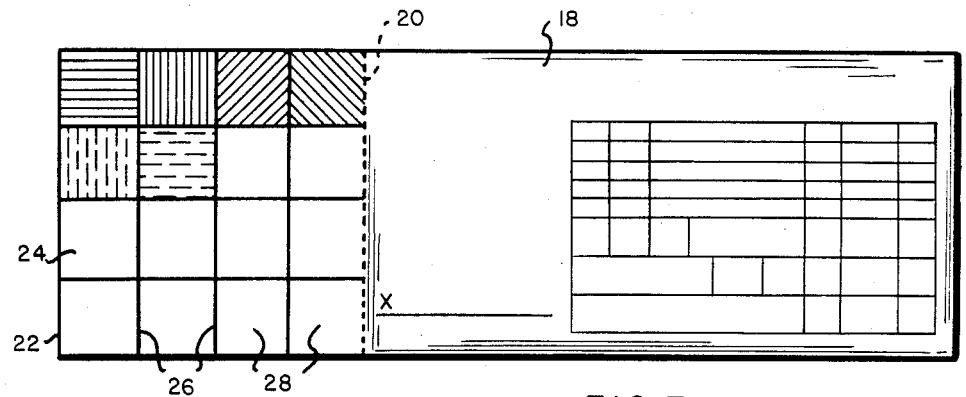
FIG. 3
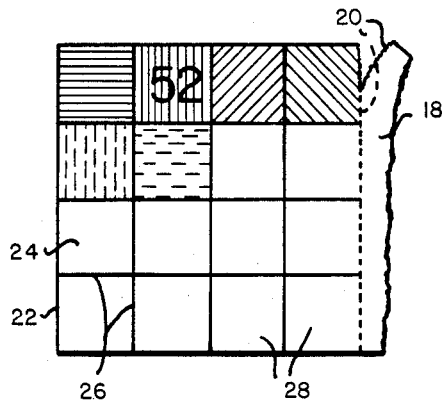
FIG. 4
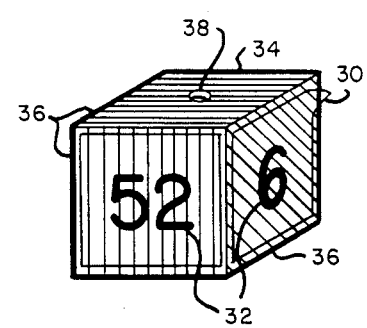
FIG. 5

CREDIT CARD SECURITY SYSTEM

BACKGROUND OF THE INVENTION

1. Field of the Invention

This invention relates generally to systems which facilitate the establishment of the identity of a specified person, and more particularly to a credit card security system for facilitating establishment of the identity of a person presenting a credit card in order to make payment for goods or services.

2. Description of the Prior Art

The use of credit cards, issued either by financial institutions or retail stores, is becoming increasingly widespread in today's credit economy. In the usual credit card transaction, if a person holding a credit card wishes to make payment for goods or services to a party honoring the specific credit card, the person presents the credit card to a representative of the party willing to accept payment in such a manner at the appropriate time. The accepting party then imprints information from the credit card, usually with the assistance of specially constructed devices, onto a credit card sales slip, inscribes specific purchase and price information on the slip, and requests the credit card holder to sign the slip in order to complete the transaction. A copy of the sales slip is then handed to the bearer of the credit card, together with the credit card itself, but rarely is the bearer of the credit card asked to present identification to determine whether that person is one entitled to present the specified credit card.

Although lists of credit cards which have been cancelled for various reasons, such as theft or loss, are issued periodically by the credit card companies, these lists, even if used by a party honoring cards issued by a specific company, lag behind newly stolen or lost cards, and of course cannot possibly contain information regarding credit cards whose theft or loss has not even been detected by the legitimate credit card holder. Further, although transactions involving larger amounts of money frequently are reported to the credit card company in order to obtain an "authorization" code number for the transaction, possible fraud can be detected by such a procedure only if the card has been previously reported lost or stolen.

Various proposals have been made for preventing misuse of credit cards. These proposals generally are of two kinds: those using a code and those using a removable card-part.

U.S. Pat. Nos. 4,184,148 and 4,445,712, issued on Jan. 15, 1980, and May 1, 1984, respectively, to E. A. Smagala-Romanoff, disclose examples of the use of a code system, wherein a credit card holder is asked at the time of presentation of the credit card to correctly identify a correct set of digits from a multiplicity of digits randomly arranged on a grid or grids presented to the card holder. The person presenting the credit card must be able to promptly determine these digits from their predetermined position on the grid or grids.

U.S. Pat. No. 4,100,689, issued July 18, 1978, to A. U. Browne, discloses a transaction or credit card having mounted thereon a code wheel provided with indicia selectively viewable through a window provided in the associated credit card. The person presenting the credit card thus must promptly position a specified indicia in the window in order to complete a coded designation of authorized use for the specific card. This approach, however, requires physical modification of credit cards themselves, a rather cumbersome, expensive, and inconvenient process.

The physical modification of the credit card also is a disadvantage to the approach of having removable parts to a credit card. In addition, the removable parts are subject to loss by the card holder because of the inconvenience of carrying the removable parts separately from the main part of the credit card. Examples of this approach can be found in prior U.S. Pat. Nos. 3,283,713, issued Nov. 8, 1965, to E. V. Wooster; 3,434,414, issued Mar. 25, 1969, to L. E. Wright; 3,583,317, issued June 8, 1971, to G. W. Gibson; 3,605,619, issued Sept. 20, 1971, to J. B. Gilstrap; and 3,650,210, issued Mar. 21, 1972, to F. Archer.

SUMMARY OF THE INVENTION

It is an object of the present invention to provide a credit card security system which is more reliable and convenient to use than known systems of this kind.

It is another object of the present invention to provide a credit card security system which does not require any modification of the credit card itself.

Still another object of the present invention is to provide a code-based credit card security system in which a personal identification code can be issued to a credit card holder in a convenient and easily remembered manner.

These and other objects are achieved according to the present invention with a system of establishing the identity of a person presenting a credit card to make payment, wherein a card issuing company also issues a personal identification number to a credit card holder, such identification number being different from a number imprinted on an associated credit card. Simultaneously, or inclusive with, the issuing of the identification number is the assignment by the credit card issuing company of a predetermined color to the issued identification number. That is, the personal identification number will include a specified number of digits, together with a color, such as red, blue, and the like, which forms part of the personal identification code. When presenting the card to make a payment, the bearer of the card will be presented with a grid of blocks of various colors and required to inscribe the identification number portion of the identification code into the block on the grid of the appropriate color assigned to the identification number. Once done, the person representing the party accepting the credit card for payment can contact the credit card issuing company to verify the identification code, and if the code has been properly given, remove the grid together with a sales slip receipt and present them to the person making payment by use of the credit card.

When issuing the identification code, the credit card company can either provide the credit card holder with a token of suitable color and with appropriate indicia inscribed thereon, or can issue a decal inscribed with the identification number and allow the credit card holder to place the decal on a code holder having a face of the appropriate color. Alternatively, the numerals of the code themselves could be of the code color, and the decal placed on any suitable surface desired by the holder of the credit card.

An advantage of the present invention is that identification of a person presenting a credit card can be made in a simple and convenient manner without requiring specially constructed credit cards.

It is another advantage of the present invention that apparatus used for carrying out the security system thereof requires only the issuance of a code symbol, such as a token or decal, and the use of a color-coded grid which can be attached to a sales slip, and the like, if desired.

BRIEF DESCRIPTION OF THE DRAWING

FIG. 1 is a diagrammatic, top plan view, illustrating an example of a conventional credit card.

FIG. 2 is a diagrammatic, front perspective view, showing an example of a personal identification code carrying token according to the present invention.

FIG. 3 is a diagrammatic, front elevational view, showing a credit card sales slip provided with a color-coded grid according to the present invention.

FIG. 4 is a fragmentary, diagrammatic, front elevational view, similar to the left hand portion of FIG. 3, but showing a code properly inscribed on the color-coded grid, and the grid being removed from an associated sales slip.

FIG. 5 is a diagrammatic, perspective view, showing a sticker-carrying identification code holder which can be used in conjunction with the present invention.

DESCRIPTION OF THE PREFERRED EMBODIMENTS

Referring now more particularly to FIGS. 1 and 2 of the drawing, a conventional credit card 10 is shown in FIG. 1, and is of the conventional kind usually issued to credit account holders by credit card companies. A token 12 is shown in FIG. 2 as being generally disk-shaped and provided with a suitable color on at least one face. In FIG. 2, the face illustrated is colored red, for example, and has inscribed thereon appropriate indicia 14, in this instance the numeral "52", for example. It is to be understood that the unseen face of token 12 could also be of a suitable color, different from the color of the illustrated face, and provided with a suitable identification number if desired. Although the drawing uses a number as an example of an identification code, it is to be understood that other idicia, such as letters of the alphabet, could be employed as well. An aperture 16 is provided in a peripheral portion of token 12 so as to permit token 12 to be mounted on a key chain (not shown), for instance, and the like, for convenience.

Although a token 12 can be carried around with a bearer of a credit card 10, it is preferred that the code, both the indicia and color, be memorized and the token retained in a safe place other than the person of the credit card bearer.

Referring now more particularly to FIGS. 3 and 4 of the drawing, a conventional credit sales slip 18 is illustrated in the right hand portion of FIG. 3, to which is connected by a conventional tear line 20, and the like, a generally planar element 22 forming a planar surface 24 and functioning as, for example, a stub of slip 18. Although element 22 is illustrated in FIG. 3 as attached to the left portion of slip 18, it is to be understood that element 22 could be attached at the right side of slip 18 in a suitable manner, not shown, as may be convenient. Provided on surface 24 of element 22 is a grid 26 of generally rectangular boxes 28, each of which boxes 28 is of a color different from any of the other boxes 28 so as to form an arrangement permitting inscription of identification codes as appropriate. For example, as seen in FIG. 4, the identification code employing the number "52" together with the color red, as illustrated in FIG. 2, can be indicated on a grid 26 by inscription, such as printing with a suitable writing instrument (not shown) the number "52" on the box 28 colored red. Once done, the element 22 can be torn from slip 18 by use of tear line 20, and the element 22 handed to the credit card bearer for security purposes.

In accordance with the invention, therefore, a credit card company issues a credit card and identification code including an identification number or combination of letters, and an assigned color also will be issued to the credit card customer, advantageously in the form of a colored token having the identification code indicated thereon. The company issuing the credit card then provides merchants, and the like, honoring the cards issued by that company with credit sales slips including a stub or tab forming a grid of a plurality of preselected colors for use in completing transactions involving credit cards issued by the aforementioned company. A person presenting a credit card from the company is then required to inscribe the identification number issued to that peson by the company for the specific credit card being used on a color of the grid preferably presented as part of the sales slip. If the party honoring the credit card desires verification, the credit card company can be contacted as by a toll-free telephone number, and the credit card number and identification code read to the company who then either verifies or rejects the transaction. If approved, the stub or tab containing the grid of colors can be removed from the credit sales slip and handed to the person presenting the credit card for payment together with the sales slip receipt and the credit card to complete the transaction. The credit card bearer then can destroy the grid for security purposes.

If on contacting the credit card issuing company, however, the company indicates that the identification code is improper for the credit card presented, the issuing company could immediately "block" or otherwise deactivate that particular credit account until the situation is clarified. It will be appreciated that exact procedures to be taken if the identification code is not properly given will vary from jurisdiction to jurisdiction depending on state and local laws. Further, although the card containing the grid of colored boxes has been disclosed above as forming a stub or tab of a credit sales slip, it is to be appreciated that this card could be made part of a separate pad of such cards if so desired.

FIG. 5 illustrates the issuance of identification codes in the form of decals 30 inscribed with the identification number, or group of letters, in the form of suitable indicia 32. Although the decals or stickers issued by a credit card company so as to reveal a card holder's personal identification code could be used in any suitable manner, it is preferable that the decals 30 be placed on a cube-shaped member 34 defining six faces 36, each of which faces 36 is of a color different from a color of any of the other of the faces. For example, a decal containing indicia forming the numeral "52" will be placed on a face 36 which is colored red. In this manner, any decal 30 described in predetermined indicia 32 is selectively affixable on a one of the faces 36 of member 34 having a color corresponding to a color predetermined to mate with the predetermined indicia. With a multi-faced member 34, a person holding several credit cards can carry the identification codes of each on a single element, if desired. A hole 38 can be provided in a pair of faces 36 of a member 34, with hole 38 being illustrated in only a single face 36 for clarity, in order to permit attachment of member 34 to a conventional key chain (not shown), and the like, for convenience in carrying the code holder if so desired.

Alternatively to the arrangement illustrated at FIG. 5, a member 34 may be of a single color, such as white, and the indicia provided on each decal of the appropriate code color in a manner not illustrated. By this arrangement, a credit card customer would have little difficulty in placing the decals on a single member with proper color coordination.

As can be readily understood from the above description and from the drawing, a credit card security system according to the present invention permits reliable and convenient identification of a person presenting a credit card as a legitimate holder of the card. No special modification of a credit card is needed to make identification in accordance with the system, with the provision of a color-coded grid being of minor expense that can be included in the cost of manufacturing credit sales slips.

It is to be understood that the above description of the present invention is capable of various changes, modifications, and adaptions, and such are intended to be included within the meaning and range of equivalents of the following claims.

I claim:

1. A method of establishing the identity of a person presenting a credit card to make payment, comprising the steps of:
   (a) issuing an identification code to a credit card holder, the identification code being different from a number of an associated credit card;
   (b) assigning a predetermined color as part of the identification code issued;
   (c) providing a grid of various colors at a point of payment;
   (d) requiring a person presenting a credit card to inscribe the identification code issued for the credit card on a color appearing on a grid provided, which color corresponds to the color included in the identification code; and
   (e) verifying the identification code inscribed and color matched.

2. A method as set forth in claim 1, wherein the step of issuing an identification code includes the step of transferring to the credit card holder a decal inscribed with the identification code.

3. A method as set forth in claim 1, wherein the step of issuing an identification code includes the step of transferring to the credit card holder a colored token having the identification code inscribed thereon.

4. A method as defined in claim 1, wherein the step of providing a grid includes the step of attaching a grid of a plurality of pre-selected colors to a credit sales slip as a removable portion.

5. A method as set forth in claim 1, wherein the step of verifying the identification code inscribed and color matched includes the step of contacting a company that issued the credit card.

6. A method as defined in claim 5, wherein the step of providing a grid includes the step of attaching a grid of a plurality of pre-selected colors to a credit sales slip as a removable portion.

7. A method as set forth in claim 6, wherein the step of verifying further includes the step of removing the grid of colors from a credit sales slip of a verified transaction.

8. A method as set forth in claim 7, wherein the step of issuing an identification code includes the step of transferring to the credit card holder a decal inscribed with the identification code.

9. A method as set forth in claim 7, wherein the step of issuing an identification code includes the step of transferring to the credit card holder a colored token having the identification code inscribed thereon.

10. Apparatus for establishing the identify of a person presenting a credit card to make payment, comprising, in combination:
    (a) a generally planar element forming a planar surface; and
    (b) a grid of generally rectangular boxes provided on the surface of the element, each of the boxes being colored differently from any of the other of the boxes and arranged forming means for permitting inscription of an identification code in a one of the boxes as appropriate for identifying a color-part of the identification code.

11. Apparatus as defined in claim 10, further including a credit sales slip, and tear means for removably attaching the element to the sales slip.

* * * * *